United States Patent
Shimada

(10) Patent No.: US 7,840,820 B2
(45) Date of Patent: Nov. 23, 2010

(54) STORAGE SYSTEM AND METHOD OF CONTROLLING OF FEEDING POWER TO STORAGE SYSTEM

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 11/622,554

(22) Filed: Jan. 12, 2007

(65) Prior Publication Data

US 2008/0104431 A1    May 1, 2008

(30) Foreign Application Priority Data

Oct. 30, 2006    (JP) .............................. 2006-294309

(51) Int. Cl.
  *G06F 3/00*    (2006.01)
(52) U.S. Cl. ...................... 713/300; 713/310; 713/320; 713/321; 713/322; 713/323; 713/324; 713/330; 713/340; 710/15; 710/16; 360/31
(58) Field of Classification Search ................. 713/300, 713/310, 320–324, 330, 340; 710/15, 16, 710/18; 60/31
See application file for complete search history.

(56) References Cited

U.S. PATENT DOCUMENTS

| | | | |
|---|---|---|---|
| 5,481,733 A | 1/1996 | Douglis et al. | |
| 5,954,820 A | 9/1999 | Hetzler | |
| 7,143,203 B1 * | 11/2006 | Altmejd | ...................... 710/16 |
| 2005/0223344 A1 * | 10/2005 | Sato et al. | ....................... 716/1 |
| 2007/0061510 A1 * | 3/2007 | Kumagai et al. | ............ 711/112 |
| 2008/0263275 A1 | 10/2008 | Cooper | |

FOREIGN PATENT DOCUMENTS

| | | |
|---|---|---|
| JP | 09-282057 | 10/1997 |
| JP | 2004-252570 | 9/2004 |
| WO | WO 2006/037091 | 4/2006 |
| WO | WO 2006/134039 | 12/2006 |

* cited by examiner

*Primary Examiner*—Abdelmoniem Elamin
(74) *Attorney, Agent, or Firm*—Antonelli, Terry, Stout & Kraus, LLP.

(57) ABSTRACT

A storage system of the present invention saves power consumption of the storage system and enhances responsiveness by predicting a disk drive that is to be accessed next on the basis of an access request from a host system, and promptly feeding power to the predicted disk drive. A prediction unit predicts the disk drive which is to be accessed next by the host system, by comparing a recent access request from the host system against a past access pattern that is registered in an access pattern record table. A power control unit feeds power from a power unit to the disk drive predicted by the prediction unit.

11 Claims, 15 Drawing Sheets

FIG. 5

ACCESS PATTERN RECORD TABLE

| RECORD NUMBER | TIMES OF HITS | HISTORY LENGTH | ACCESS SEQUENCE | | | | |
|---|---|---|---|---|---|---|---|
| | | | FIRST | SECOND | THIRD | ... | NTH |
| 1 | 10 | 2 | 01 | 02 | – | ... | – |
| 2 | 4 | 2 | 03 | 04 | – | ... | – |
| 3 | 5 | 3 | 05 | 06 | 07 | ... | – |
| ... | ... | ... | ... | ... | ... | ... | ... |

FIG. 9

ACCESS PATTERN RECORD TABLE T5

| RECORD NUMBER | TIMES OF HITS | HISTORY LENGTH | ACCESS SEQUENCE | | | | | | | |
|---|---|---|---|---|---|---|---|---|---|---|
| | | | FIRST | INTERVAL | SECOND | INTERVAL | THIRD | INTERVAL | ... | NTH |
| 1 | 10 | 2 | LU01 | 5min | LU02 | – | – | – | ... | – |
| 2 | 4 | 2 | LU03 | 12min | LU04 | – | – | – | ... | – |
| 3 | 5 | 3 | LU10 | 3min | LU11 | 4min | LU12 | – | ... | – |
| ... | ... | ... | ... | ... | ... | ... | ... | ... | ... | ... |

I51 / I52 / I53 / I54 (I54A / I54B)

STORAGE SYSTEM AND METHOD OF CONTROLLING OF FEEDING POWER TO STORAGE SYSTEM

CROSS-REFERENCE TO RELATED APPLICATIONS

This application relates to and claims priority from Japanese Patent Application No. 2006-294309 filed on Oct. 30, 2006, the entire disclosure of which is incorporated herein by reference.

BACKGROUND OF THE INVENTION

1. Field of the Invention

The present invention relates to a storage system and a method of controlling of feeding power to a storage system.

2. Description of the Related Art

A storage system comprises a storage unit, which connects a large number of hard disk drives in an array, and provides a logical storage area (logical volume) to a server or other such host computer (hereinafter "host system"). To enforce reliability and so forth, the storage system provides a host system with a redundant storage area based on RAID (Redundant Array of Independent Disks).

Now then, the data being managed by companies and so forth is increasing day by day. The more the amount of the data is increasing, the larger the number of disk drives connected within a storage system is required. Hence, the larger the number of disk drives connected within a storage system increases, the greater the amount of power a storage system consumes.

Accordingly, some methods for controlling the feeding of power to disk drives connected within a storage system have been proposed. As a first prior art, a method for planning a schedule for feeding power based on a job execution schedule in a host system (Japanese Patent Laid-open No. 9-282057) is known. As a second prior art, a method for feeding power to respective disk drives based on a utilization rate and times of powering on and off of the respective disk drives (Japanese Patent Laid-open No. 2004-252570) is known.

The above-mentioned first prior art reduces power consumption based on a job execution schedule in a host system. Consequently, in a prior art such as this, controlling the power reduction of a storage system depends on a host system, and a storage system cannot control feeding of power to a plurality of disk drives within the storage system independently.

The above-mentioned second prior art controls the feeding of power to a disk drive irrespective of the accesses from the host systems. Therefore it is difficult to reduce the access time from the host systems.

SUMMARY OF THE INVENTION

With the foregoing problems in view, it is an object of the present invention to provide a storage system capable of reducing the amount of power respective storage devices consume, and of reducing access time by predicting and feeding power to the storage device to be accessed next by a host system. Furthermore, it is another object of the present invention to reduce the operating time of each storage device while reducing host system access time, thereby extending the life time of the respective storage devices. Yet further objects of the present invention should become clear from the descriptions of the embodiments provided as follows.

A storage system according to one aspect of the present invention designed to solve for the above-mentioned problems comprises a plurality of storage devices; and a controller for inputting/outputting data to/from the respective storage devices in response to an access request from a host system. The controller comprises an access request processing unit which accesses a specific storage device from among the storage devices, and inputs/outputs data to/from the specific storage device in response to an access request issued from a host system; a prediction unit which, based on the access request extracted by the access request processing unit, predicts at least one or more next access target storage devices to be accessed next by a host system from among the storage devices; and a power control unit which stops the feeding of power from a power unit to a storage device that satisfies a preset condition from among the storage devices, and which feeds power from a power unit to the next access target storage device.

In an embodiment of the present invention, the prediction unit comprises a history record table for storing the history of the access sequence of a host system for the respective storage devices, and predicts a next access target storage device based on this history record table.

In an embodiment of the present invention, the controller comprises an address translation unit for translating a logical address included in an access request from a host system to a physical address of the respective storage devices, and the prediction unit stores a history of logical address in the history record table.

In an embodiment of the present invention, the access sequence of the respective storage devices and the time between the respective accesses are stored in the history record table, and the power control unit feeds power prior to the time required for the next access target storage device to complete to be powered on so that the next access target storage device is ready to be accessed at the time when a host system is predicted to access the next access target storage device.

In an embodiment of the present invention, at least one part of the recorded contents of the history record table can be set by at least one of a host system or a supervising terminal connected to the controller.

In an embodiment of the present invention, the prediction unit carries out the feeding of power and the stopping of power to the respective storage devices based on either a preset date or time.

In an embodiment of the present invention, information showing prediction hit rate is also stored in the history record table, and the prediction unit, upon detecting a multiple of candidates for the next access target storage device, selects as the next access target storage device the candidate for which prediction hit rate is the highest.

In an embodiment of the present invention, the power control unit stops the power to a storage device which is not predicted as the next access target storage device from among the storage devices and which has been accessed least recently of the storage devices.

In an embodiment of the present invention, the controller comprises a times of operation recsequence for storing times of operation of starting and stopping feeding of power to the respective storage devices, and the power control unit selects a predetermined number of storage devices in sequence from the least recently accessed storage devices which are not predicted as the next access target storage device, and stops the feeding of power to the storage device among the selected ones that has the fewest times of operation.

A method of feeding power to a storage system, which accords with another aspect of the present invention, is a method of controlling of feeding power to a plurality of storage devices respectively, in a storage system which comprises the storage devices and a controller for inputting/outputting data to/from the respective storage devices in response to an access request from a host system, the method comprising the steps of storing the record of the sequence in which a host system accesses the storage devices in a history record table; predicting the next access target storage device to be accessed next by a host system, on the basis of the record of the history record table; and feeding power from a power unit to the next access target storage device when power is not fed from the power unit to the next access target storage device.

An embodiment of the present invention, further comprising the step of stopping the feeding of power to a storage device which is not predicted as the next access target storage device and which has been accessed least recently by a host system from among the storage devices.

An embodiment of the present invention, further comprising the steps of selecting a predetermined number of storage devices in sequence from the least recently accessed storage devices which are not predicted as the next access target storage device; and stopping the feeding of power to the storage device from among the selected storage devices that has the fewest times of operation of starting and stopping the feeding of power.

BRIEF DESCRIPTION OF THE DRAWINGS

FIG. 5 is a drawing showing a configuration of a table for managing an access pattern;

FIG. 9 is a drawing showing a configuration of an access pattern record table utilized in a storage system related to a second embodiment of the present invention;

DESCRIPTION OF THE PREFERRED EMBODIMENTS

The embodiments of the present invention will be explained as follows on the basis of the figures. Furthermore, the following explanation provides a concept of the present invention to the extent required by a so-called person with ordinary skill in the art to understand and put the present invention into practice, but the scope of the present invention is not limited to the following description.

Figure 1:
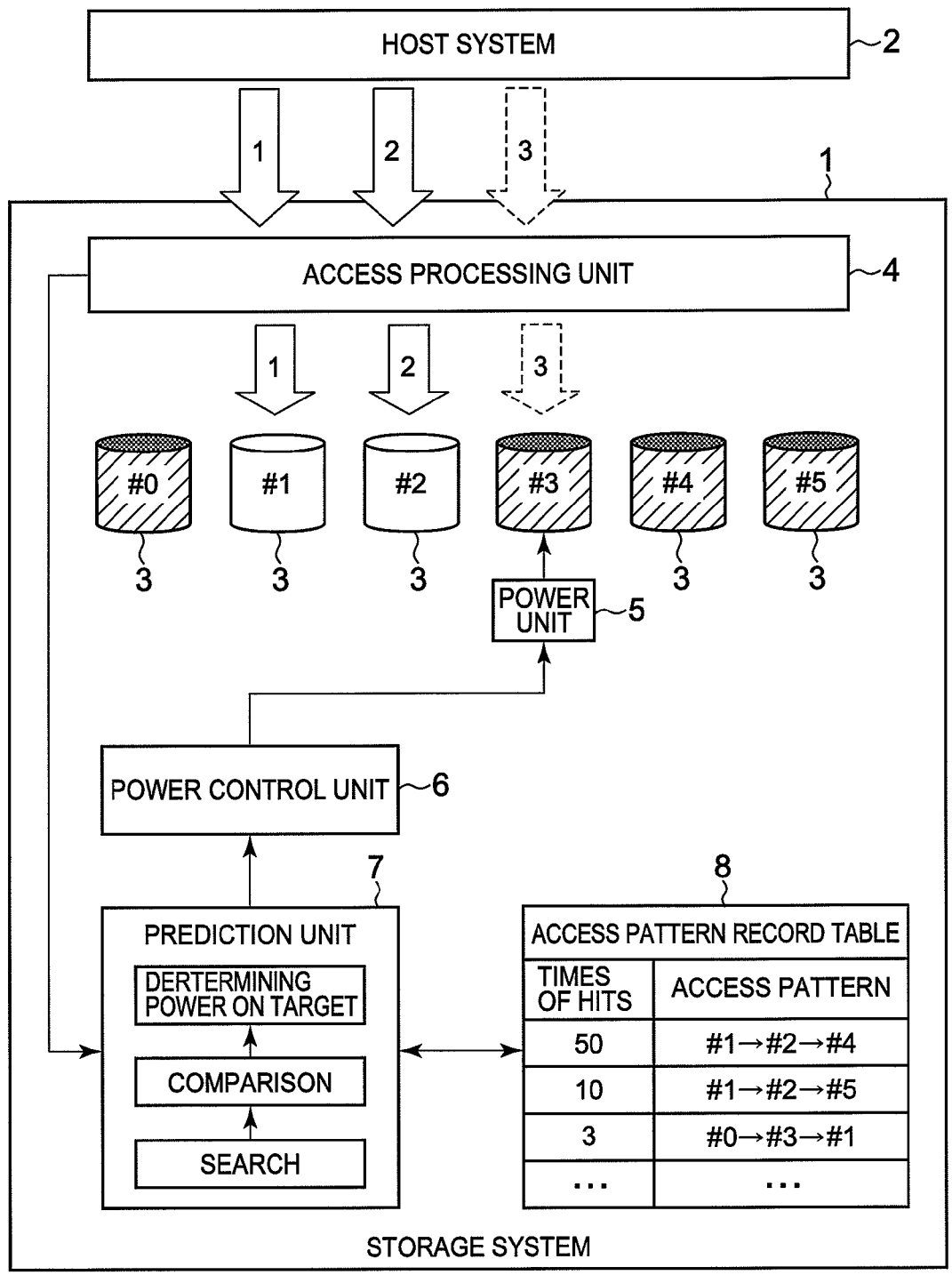
FIG. 1 is a drawing showing a concept of an embodiment of the present invention.

FIG. 1 is a drawing showing an overall concept of this embodiment. The information system shown in FIG. 1, for example, comprises at least one or more storage systems 1, and at least one or more host systems 2.

A host system 2 corresponds to an "upper-level system". A host system 2, for example, can be a mainframe, a server, or other such a computer system. In FIG. 1, only one host system 2 is shown for the sake of convenience. Actually, a plurality of host systems 2 can be used with sharing one or more storage systems 1 among them. When a storage system 1 is shared by a plurality of host systems 2, for example, zoning, LUN (Logical Unit Number) masking and other such techniques are utilized. Accordingly, each host system 2 can only access a port or logical volume (LU) that it itself has authority to access.

A storage system 1, for example, consists of a plurality of disk drives 3; an access processing unit 4; a power unit 5; a power control unit 6; a prediction unit 7; and an access pattern record table 8.

A disk drive 3 corresponds to a "storage device". The storage device will be called a disk drive here for convenience sake, but a storage device that uses a medium other than a hard disk can also be utilized. For example, a hard disk drive, a flash memory device, an optical disk drive, a magneto-optic disk drive, and a magnetic tape device or the like can be used as a disk drive 3. As will become clear from the embodiments explained as follows, one or more logical storage areas can be set by virtualizing a physical storage area of disk drives 3. This logical storage area is called a logical volume. A host system 2 recognizes a logical volume as an access target.

The access processing unit 4, power control unit 6 and prediction unit 7 constitute a "controller." Further, the access pattern record table 8 resides inside the controller. For example, memory, such as a cache memory, control memory and the like can be provided in the controller, and the control information and supervising information used for controlling the operation of a storage system 1 can be stored inside these memories.

The controller, for example, consists of at least one or more processors, a memory, a data processing unit, and some interfaces. The access processing unit 4, power control unit 6 and prediction unit 7 can respectively function using some programs which are executed by the processors to control the individual hardware parts.

The access processing unit 4 corresponds to the "access request processing unit". The access processing unit 4 analyzes a command issued from a host system 2, and executes operations required by the command. For example, when a write command is issued by a host system 2, the access processing unit 4 writes the write-data received from the host system 2 to the disk drives 3 which correspond to the logical volume specified by the host system 2. When a read command is issued by a host system 2, the access processing unit 4 reads the data requested by the host system 2 from the disk drives 3 which correspond to the logical volume specified by the host system 2, and sends the data to the host system 2. Thus, the access processing unit 4, on the basis of a command received from a host system 2, translates the logical address of a specified logical volume to the physical address of a disk drive 3, executes the operation requested by the host system 2, and sends the results thereof to the host system 2.

The power unit 5 is an apparatus for feeding a specific type of power to the respective disk drives 3. In FIG. 1, only one power unit 5 is shown for the sake of expediting the explanation. However, as will become clear from the embodiments described as follows, a local power unit 5 can be provided to each of the respective disk drives 3. The respective power units 5 are configured so as to feed either one type or multiple types of direct current power to each disk drive 3 on the basis of an instruction from the power control unit 6. Furthermore, instead of a structure that provides a local power unit 5 for each disk drive 3, one or more power units, which is capable of feeding power to all the disk drives 3, can also be used.

The power control unit 6 controls the feeding of power and the stopping of power to the respective disk drives 3. The power control unit 6, upon detecting a disk drive 3 that satisfies a preset, predetermined power-off condition, issues an instruction to the power unit 5 corresponding to that disk drive 3, and stops the power to the disk drive 3. Predetermined power-off conditions, for example, can be a condition in which a disk drive 3 has not been accessed for a predetermined time or longer, or a disk drive 3, which is least recently accessed.

The prediction unit 7 predicts a logical volume on the basis of an access request issued by a host system 2 which will be accessed at the next access request by the host system 2. Then, the prediction unit 7 specifies the disk drives 3 corresponding to the predicted logical volume, and instructs the power control unit 6 to feed power to the specified disk drives 3.

The access pattern record table 8 corresponds to the "history record table". The access pattern record table 8, for example, stores the pattern of accesses by a host system 2, along with the times of hits (frequency of occurrence) of this access pattern. An access pattern is the sequence of logical volumes (ultimately, disk drives 3) accessed by a host system 2.

For example, an application program, such as a database, running on a host system 2 can executes a series of operations with switching a plurality of logical volumes to be accessed. Therefore, a pattern depicting the logical volumes accessed and the sequence in which they are accessed depends on the operations of application program. At least one or more access patterns are extracted from access requests received by the access processing unit 4, and the extracted access patterns are recorded in the access pattern record table 8.

The prediction unit 7 retrieves an access pattern record table using the sequence of a plurality of access requests issued by a host system 2 as the retrieval key. The prediction unit 7 compares the sequence of the latest access requests against registered access patterns, and predicts the next access target logical volume.

For example, when the latest two access requests are volume Va→volume Vb, and the access pattern Va→Vb→Vc, and another access pattern of Va→Vc→Vb are registered in the access pattern record table 8, the prediction unit 7 predicts the next access target logical volume as being Vc. The prediction unit 7 specifies the one or more disk drives 3 corresponding to the predicted logical volume Vc, and instructs the power control unit 6 to feed power to the specified disk drives 3. The power control unit 6 feeds power to the specified disk drives 3.

In the example shown in FIG. 1, based on the first access request and the second access request issued by a host system 2, the prediction unit 7 predicts that the access target of the third access request to be issued in the future will be the disk drive 3 (#3). When the power to the disk drive 3 (#3) has been stopped, the power control unit 6 sends a control signal to the power unit 5 associating with the disk drive 3 (#3), and powers on the disk drive 3 prior to the third access request being issued by the host system 2 by powering the disk drive 3 (#3) from the power unit 5.

According to this embodiment, which is described as the above, the feeding of power to the disk drives 3 that are not being accessed from a host system 2 can be individually stopped inside a storage system 1 without depending on an instruction from a host system 2, or a job execution schedule in a host system 2, thus reducing power consumption.

Therefore, the more numerous the disk drives 3 the storage system 1 having, the greater the significance of the effect of reducing power consumption throughout the entire storage system 1 by carrying out control described as the above. In other words, the operation costs of the storage system 1 can be reduced. Further, with some type of disk drives, operation life time is often determined by the cumulative hours of power on time, and this embodiment can extend operation life time by stopping the feeding of power to disk drives that are not being used. Hence the efficiency of maintenance work can be raised.

Furthermore, this embodiment predicts the disk drive 3 to be accessed next by analyzing access requests from a host system 2 and comparing them against registered access patterns inside the storage system 1 without depending on instructions or the like from a host system 2. Then, this embodiment feeds power to the predicted disk drive 3 and powers it in advance to the next access request issued by the host system 2. That is, the predicted disk drive 3 is powered on and spins up to a predetermined number of rotation before an access request is issued. Therefore, a host system 2 can input/output data without waiting for the target disk drive 3 to be powered on, thereby reducing access time and enhancing the responsiveness of the storage system 1. A storage system of this embodiment will be explained in detail below.

First Embodiment

Figure 2:
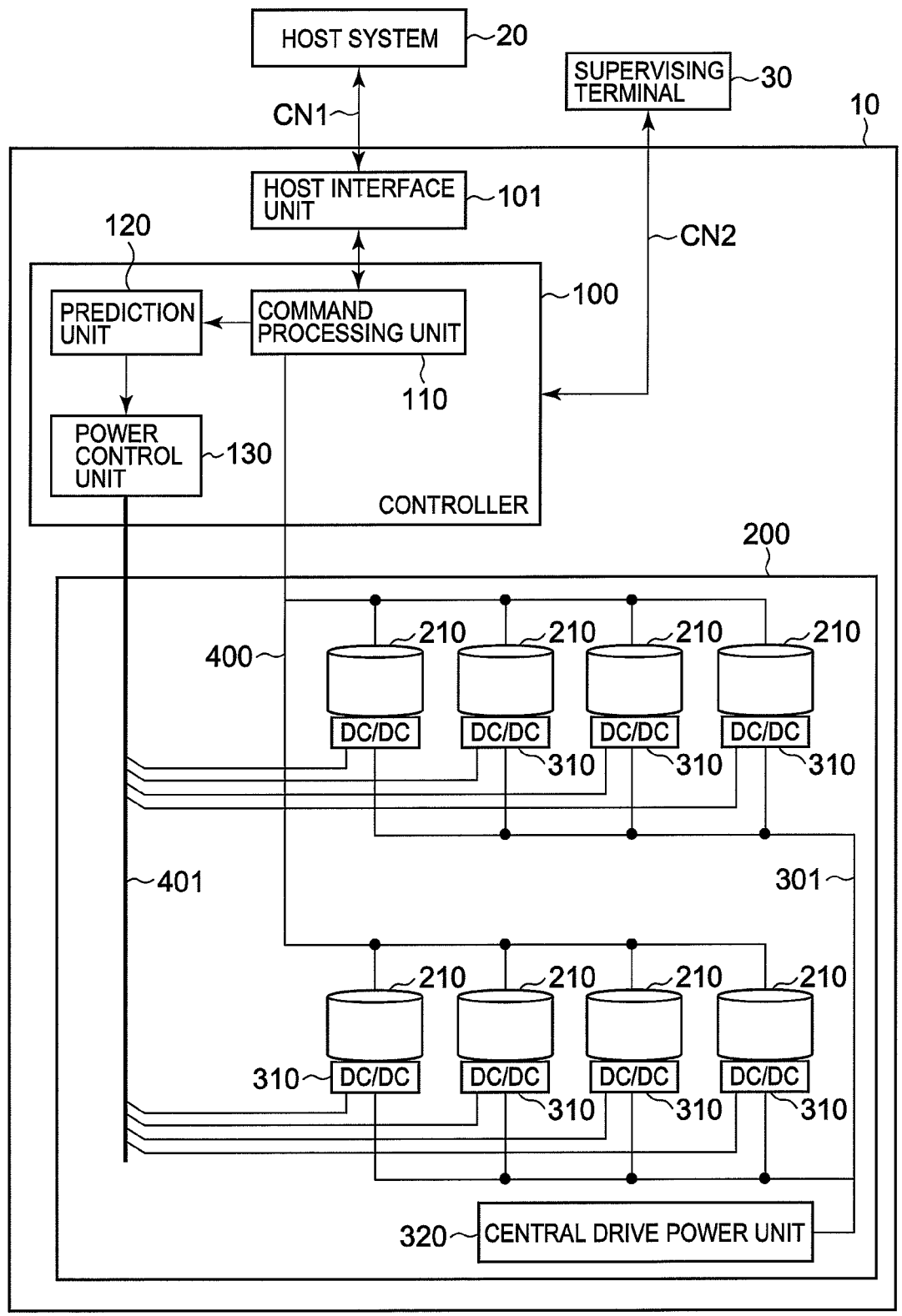
FIG. 2 is a drawing showing a simplified structure of a storage system.

FIG. 2 is a drawing showing an overall structure of a storage system. The entire system, for example, consists of a storage system 10, a host system 20, and a supervising terminal 30. The correspondent relationship with FIG. 1 will be described in advance. The storage system 10 corresponds to the storage system 1 in FIG. 1, the host system 20 corresponds to the host system 2 in FIG. 1, the disk drives 210 corresponds to the disk drives 3 in FIG. 1, the command processing unit 110 corresponds to the access processing unit 4 in FIG. 1, the power control unit 130 corresponds to the power control unit 6 in FIG. 1, the prediction unit 120 corresponds to the prediction unit 7 in FIG. 1, and the local power units 310 correspond to the power unit 5 in FIG. 1, respectively.

Host system 20, as mentioned above, is a server, mainframe or other such computer systems, and, for example, is connected to host interface unit 101 via a communications network CN1, such as a SAN (Storage Area Network), the Internet, a public line, or a leased line.

An application program installed in the host system 20 executes data processing in accordance with a request from a computer terminal not shown in the figure. When this data processing is executed, the host system 20 accesses data stored inside the storage system 10.

The supervising terminal 30 is a personal computer or some other such computer apparatus, and, for example, is connected to a controller 100 via a LAN (Local Area Network) or other such communications network CN2. The supervising terminal 30 can acquire information related to various states of the storage system 10 from the controller 100 and display them on a terminal screen. Further, the supervising terminal 30 can set the internal configuration of the storage system 10 by sending appropriate instructions to the controller 100. Furthermore, as will become clear from the embodiment described as follows, a user can register a power control schedule in the controller 100 via the supervising terminal 30.

The structure of the storage system 10 will be explained. The storage system 10, for example, consists of a controller 100, a host interface unit 101 and a storage unit 200. For convenience sake, one each of the controller 100 and host interface unit 101 are shown here, but a plurality of controllers 100 and host interface units 101 can be provided. Then, a plurality of controllers 100 can form a redundant structure, thereby enforce its reliability.

The host interface unit 101 is connected to the host system 20, and controls communications with the host system 20. The communication protocol used between the host system 20 and the host interface unit 101, for example, can be a Fibre Channel, Fibre Channel AL (Arbitrated Loop), SAS (Serial Attached SCSI), and iSCSI. When the host system 20 is a mainframe machine, for example, FICON (Fibre Connection: Registered Trademark), ESCON (Enterprise System Connection: Registered trademark), ACONARC (Advanced Connection Architecture: Registered Trademark), FIBARC (Fibre Connection Architecture: Registered trademark) and other such communication protocols can be used. Furthermore, in FIG. 2, the host interface unit 101 is placed outside of the controller 100, but other structures can also be realized such that the host interface unit 101 is included by the controller 100.

The controller 100 controls the overall operation of the storage system 10. The controller 100, for example, consists of a command processing unit 110, a prediction unit 120, and a power control unit 130. Although not shown in FIG. 2, memory, such as a cache memory, can be provided in the controller 100. A memory such as this, for example, can store write data received from the host system 20, read data read by the host system 20, and various types of supervising information for supervising the storage system 10. The detailed structures of each of the units 110, 120, 130 will be explained below together with other figures.

First, by way of a simple explanation, the command processing unit 110 processes a command issued from the host system 20, and sends the result thereof to the host system 20. The prediction unit 120 predicts the next access target from the host system 20 on the basis of the history of commands received by the command processing unit 110. The power control unit 130 outputs a control signal to the local power units 310 provided on the respective disk drives 210, and controls the feeding of power and the stopping of power from the respective local power units 310.

The structure of the storage unit 200 will be explained. The storage unit 200 provides a storage capacity. The storage unit 200 can be provided inside the same enclosure as the controller 100, and it can also be provided with other enclosure than that of the controller 100. Further, a storage capacity of another storage system not shown in the figure can also be used as if it is a storage capacity inside the storage system 10. For example, an external logical volume can be utilized as if it is a logical volume inside the storage system 10 shown in FIG. 1 by mapping a logical volume inside another storage system to a virtual volume inside the storage system 10.

The storage unit 200, for example, consists of a plurality of disk drives 210, a plurality of local power units 310, and at least one central drive power unit 320.

Each disk drive 210 provides a physical storage capacity. A disk drive 210, for example, can be an ATA (AT Attachment) disk, SCSI (Small Computer System Interface) disk, FC (Fibre Channel) disk or other such hard disk drive. Furthermore, the disk drive 210 is not limited thereto, and, for example, other memory devices, such as a semiconductor memory drive (to include a flash memory device), optical disk drive, and magneto-optic disk drive can also be used.

All disk drives 210 are connected to the command processing unit 110 via the signal line 400. The respective disk drives 210 send and receive data to and from the command processing unit 110 via the signal line 400. The communication protocol for the sending and receiving of data, for example, is Fibre Channel, Fibre Channel AL, SAS, or SATA (Serial ATA).

The local power unit 310, for example, is a DC-DC power source that converts direct current power, which is fed from the central drive power unit 320 via a power line 301, to direct current power of a predetermined voltage. A local power unit 310 is respectively provided to each disk drive 210. For example, a local power unit 310 can be incorporated inside the carrier of each disk drive 210.

The respective local power units 310 are each connected to the power control unit 130 via a signal line 401. The respective local power units 310 feed or stop power to a disk drive 210 in accordance with a control signal sent from the power control unit 130 via the signal line 401.

The central drive power unit 320 converts alternating current power located outside the storage system 10 to direct current power, and feeds it to the respective local power units 310. Although not shown in FIG. 2, the controller 100 is capable of controlling the operation of the central drive power unit 320.

Figure 3:
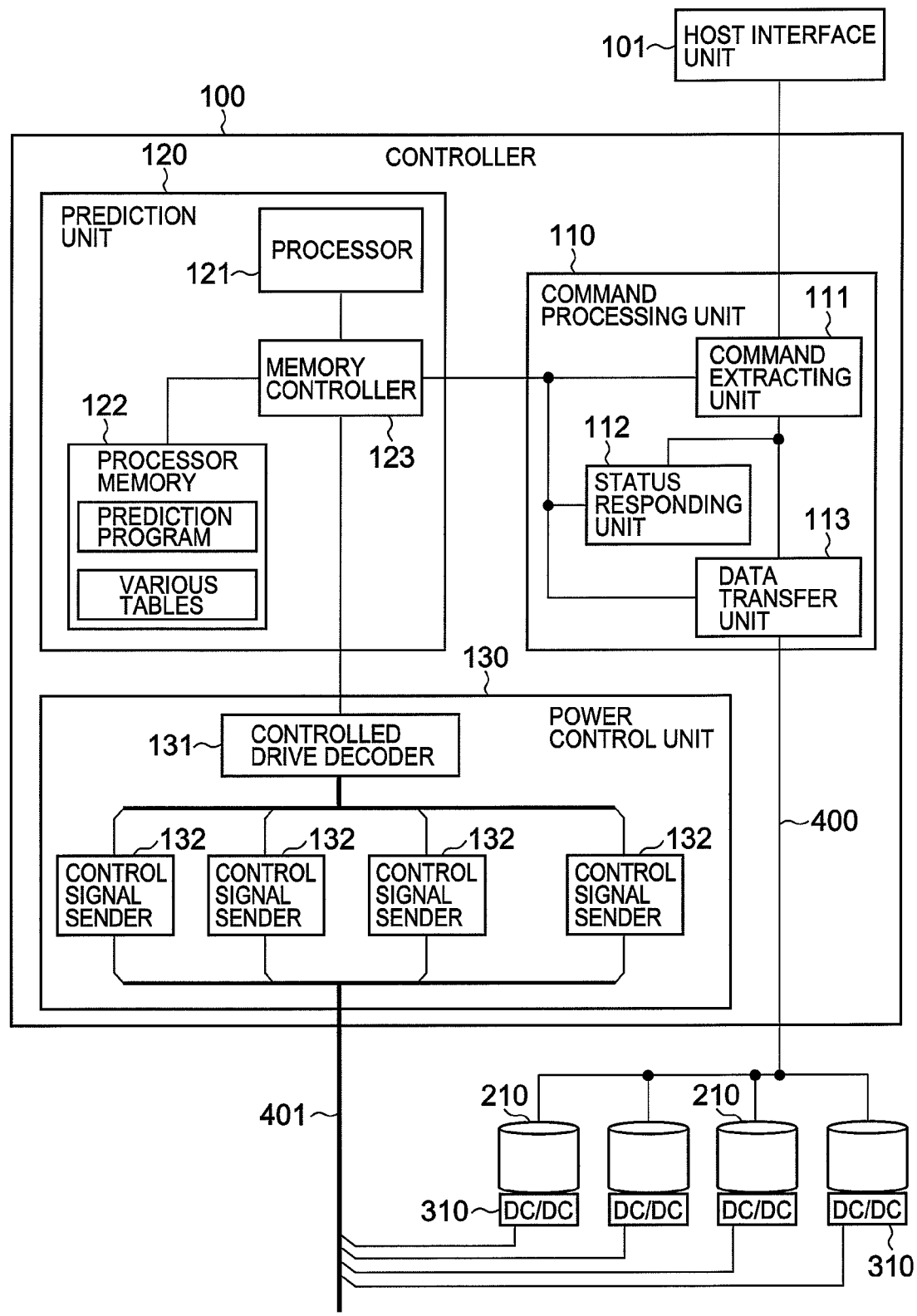
FIG. 3 is a block diagram showing a structure of a controller.

FIG. 3 is a block diagram showing the detailed structure of the controller 100. The structure of the command processing unit 110 will be explained first. The command processing unit 110, for example, consists of a command extracting unit 111, a status responding unit 112, and a data transfer unit 113.

The command extracting unit 111 is connected to the host interface unit 101. The command extracting unit 111 extracts a command from an access request from the host system 20, and transmits the extracted command to the prediction unit 120.

The status responding unit 112 is for responding the results of a command received from the host system 20 to the host system 20. The status responding unit 112, based on a notification from the prediction unit 120, generates a status showing whether the access succeeded or not. This generated status is sent to the host system 20 from the command extracting unit 111 via the host interface unit 101.

The data transfer unit 113 is connected to the respective disk drives 210 via the signal line 400. The data transfer unit 113 sends a command or data to a disk drive 210, or receives data from a disk drive 210 in accordance with a command from a host system 20. Further, the data transfer unit 113 can include a cache memory for temporarily storing data received from a disk drive 210 or data received from a host system 20.

The structure of the prediction unit 120 will be explained. The prediction unit 120, for example, consists of a processor 121, a processor memory 122, and a memory controller 123. The processor 121 executes various programs stored in the processor memory 122. Accordingly, the processor 121 controls the transfer of data in the controller 100, and executes prediction processing.

The processor memory 122 is connected to the processor 121 via the memory controller 123. The processor memory 122 stores the various programs used by the processor 121, as well as data for either control or supervisory use. The processor memory 122 also stores a prediction program for prediction processing which will be explained later. Further, the processor memory 122 can store the respective tables T1 through T6 described later. Furthermore, when the data transfer unit 113 includes a cache memory, some structure can be realized such that either all or a portion of the respective tables T1 through T6 are stored in the cache memory included in the data transfer unit 113.

The memory controller 123 is connected to the processor 121, the processor memory 122, and a controlled drive decoder 131 inside the power control unit 130. The memory controller 123 accesses the processor memory 122 in accordance with a request from the processor 121. Further, the memory controller 123, in accordance with a request from the processor 121, generates a control signal for the command processing unit 110 and a control signal for the power control unit 130, and respectively transmits these control signals to the command processing unit 110 and power control unit 130.

The structure of the power control unit 130 will be explained. The power control unit 130 is connected to each of the respective disk drives 210 via the signal line 401. Further, the power control unit 130 is also connected to the prediction unit 120. The power control unit 130, for example, consists of the controlled drive decoder 131, and a plurality of control signal senders 132.

The controlled drive decoder 131, based on a request from the processor 121 inside the prediction unit 120, determines a disk drive 210 that is to be the target of power control. The controlled drive decoder 131 provides an instruction to the local power unit 310 corresponding to the disk drive 210 determined to be the target of power control.

A control signal sender 132 is correspondingly provided to each of the local power units 310. A control signal sender 132, based on a determination by the controlled drive decoder 131, generates a control signal for controlling the operation of a local power unit 310. This control signal is sent via the signal line 401 to the local power unit 310 to which the controlled signal sender 132 is correspondent.

Control signals can include a power-on signal for feeding power from a local power unit 310, and a power-off signal for stopping the feeding of power from a local power unit 310.

A local power unit 310 is either powered on and powered off in accordance with a control signal from the control signal sender 132, and sends either a power-on complete or a power-off complete signal to the control signal sender 132. The control signal sender 132, upon receiving a response signal from a local power unit 310, notifies the processor 121 of the prediction unit 120 of the response signal via the controlled drive decoder 131.

Furthermore, the structure of the controller 100 described as the above is one example, and the present invention is not limited to the above-described structure. The controller 100 only can be composed with a hardware configuration and software configuration, which realize a function for processing a command from a host system 20 and returning the results thereof, a function for predicting the next access target based on an access request from a host system 20, and a function for individually controlling of powering on and off of the respective disk drives 210.

Figure 4:
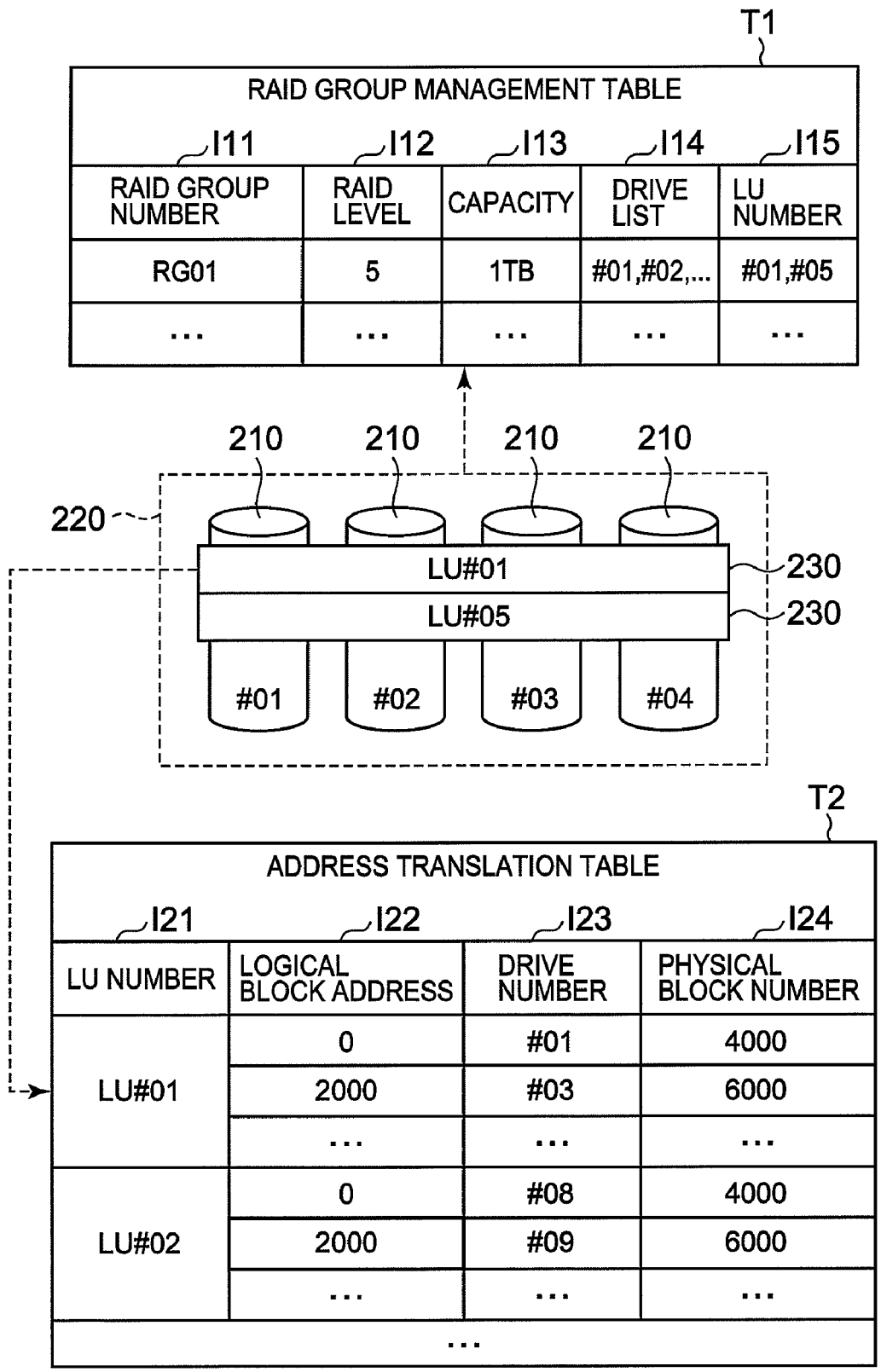
FIG. 4 is a drawing showing a relationship and supervising method of a disk drive and a logical volume.

FIG. 4 is a drawing showing a structure for the storage system 10 to manage a storage capacity of a disk drive 210. As shown in the center part of FIG. 4, for example, a RAID group 220 is constituted from a predetermined number of disk drives 210 in a four-disks-per-group, or eight-disks-per-group configuration. The RAID group 220 virtualizes the physical storage capacity of the respective disk drives 210, and integrates them into a single logical storage capacity. The RAID group 220 may also be called a parity group.

Either one or more logical volumes 230 of either a predetermined size or an arbitrary size can be set in the physical storage capacity of the RAID group 220. Furthermore, one or more logical volumes 230 can also be provided in the physical storage capacity of a single disk drive 210.

A logical volume 230 generated inside a storage system 10 has a LUN (Logical Unit Number), and a communication path is established with a host system 20. Accordingly, the logical volume 230 is recognized as an access target by the host system 20.

A host system 20 writes data to a targeted logical volume 230, and reads data from a targeted logical volume 230 by specifying a logical volume 230 number, the top logical address (LBA: Logical Block Address), and the block size of the top logical address.

The RAID group management table T1 shown at the top of FIG. 4 is a table for managing the respective RAID groups 220 of the storage system 10. This table T1, for example, has a RAID group number I11, a RAID level I12, a capacity I13, a drive list I14, and a volume number (LU number in the figure) I15.

The RAID group number I11 is information for identifying each of the respective RAID groups 220. The RAID level I12 represents the RAID level and configuration of this RAID group 220, such as, for example, RAID 1 through RAID 6, and 6D2P (a configuration that simultaneously uses six pieces of data and two parities) or 7D1P, and so forth. The capacity I13 is information showing the total storage capacity of this RAID group 220. The drive list I14 is information for specifying a disk drive 210 constituting this RAID group 220. The volume number I15 is information for specifying a logical volume 230 set in this RAID group 220. Furthermore, the table T1 can also has other items besides the respective items I11 through I15 mentioned above. Further, the table T1 can also has the above-mentioned items or a portion of the above-mentioned items which is managed by some separate tables.

An address translation table T2 shown at the bottom of FIG. 4 is a table used for translating a logical address to a physical address. The address translation table T2, for example, manages relationship of a volume number I21, a logical block address I22, a drive number I23, and a physical block address I24.

The volume number I21 is information specifying a logical volume 230. The logical block address (LBA) I22 is information specifying the address of this logical volume 230 inside a storage capacity. The drive number I23 is information specifying a disk drive 210, which is providing the physical storage capacity for this logical volume 230. The physical block address I24 is information showing an address inside the storage capacity of this disk drive 210.

Using an address translation table T2 configured like this makes it possible to translate a logical address specified by a host system 20 to a physical address of a disk drive 210, and to read and to write the date associating with the physical address. Furthermore, the configurations of the tables T1, T2 shown in FIG. 4 are examples, and the present invention is not limited to the configurations shown in FIG. 4. The same holds true for the respective tables and flowcharts described as follows.

FIG. 5 is a drawing showing the configuration of an access pattern record table T3. This table T3 is stored in the processor memory 122, and is used in the prediction processing executed by the processor 121. This table T3 corresponds to the "history record table". The access pattern record table T3, for example, manages a record number I31, the times of hits I32, history length I33, and access sequence I34.

The record number I31 is the information showing the sequence of the respective records, and is also information for identifying an access pattern (access sequence I34). The times of hits I32 is information indicating the number of times this access pattern hit, that is, the frequency of occurrence. The history length I33 is information indicating the length of this access pattern, that is, the number of logical volumes 230 within the access sequence. The access sequence I34 is information showing the sequence of the logical volumes 230 that have been accessed, that is, the access pattern.

Figure 6:
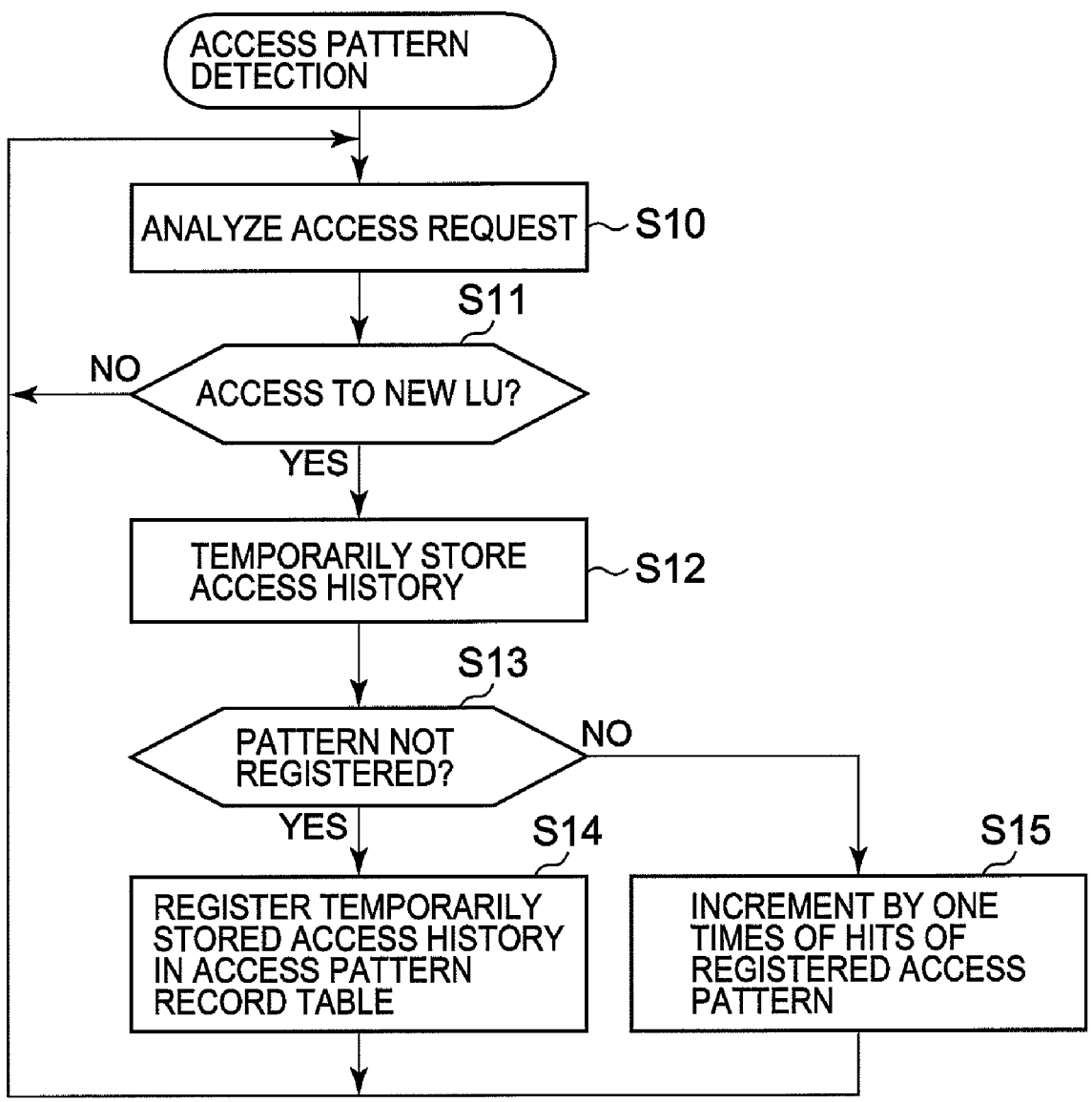
FIG. 6 is a flowchart showing a process for detecting an access pattern.

FIG. 6 is a flowchart showing the process for detecting an access pattern, and registering it in access pattern record table T3. Furthermore, the respective flowcharts described below only show concepts of processes within the scope necessary to understand and implement the present invention, and these flowcharts may differ from the one of the actual computer programs. Further, it may also be possible to rearrange the steps set forth in the flowcharts, or even to add, change or delete a step. The process described below is executed by the processor 121 of the prediction unit 120. However, for the sake of expediting the explanation, the controller 100 will be treated as the processing unit.

The controller 100 analyzes an access request issued from a host system 20 (S10), and determines whether or not it is an access to a new logical volume 230 (S11). A new logical volume 230 refers to a logical volume 230 that has not been accessed previously.

When it is determined to be an access request for the same logical volume 230 that was previously accessed target (S11: NO), processing returns to S10. When it is determined to be an access to a new logical volume 230 (S11: YES), the controller 100 temporarily stores the volume number (volume identifier) of the accessed logical volume 230 as an access history (S12).

The controller 100 determines whether or not the temporarily stored access history is a new access pattern (S13). When it is determined to be a new access pattern (S13: YES), the controller 100 registers the temporarily stored access history in the access pattern record table T3 (S14).

On the contrary, when it is determined to be an access pattern that is already registered (S13: NO), the controller 100 increments the times of hits of this registered access pattern by one (S15).

In accordance with this processing, every time a host system 20 switches the access target logical volume 230, an access history is temporarily stored, and compared against an access pattern registered in table T3. Then, when a new access pattern is detected, this detected new access pattern is added to table T3. When the access target logical volume 230 is switched in the same order as a registered access pattern, the times of hits of this registered access pattern is incremented by one.

Figure 7:
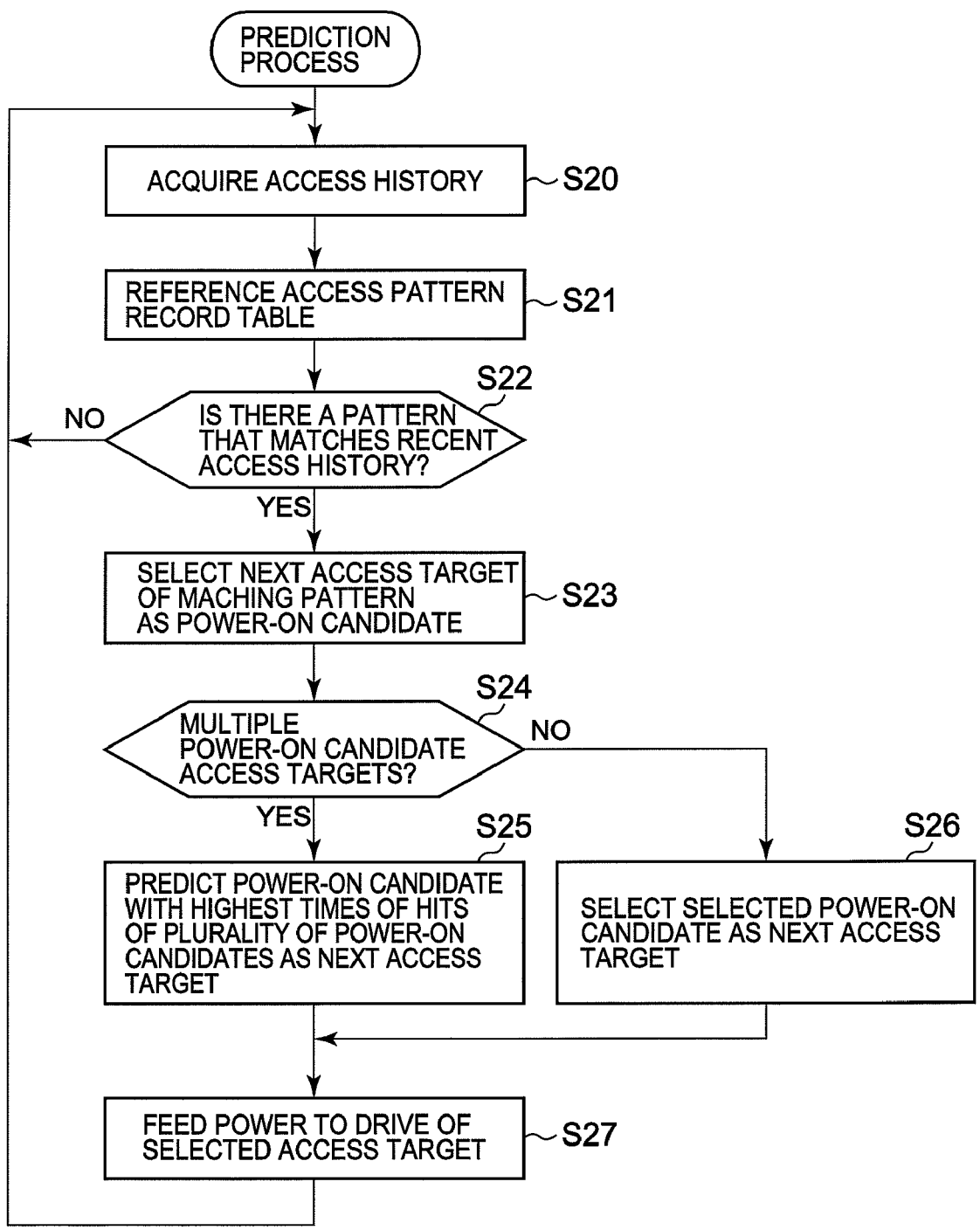
FIG. 7 is a flowchart showing a process for predicting a disk drive that is to be accessed next by a host system.

FIG. 7 is a flowchart showing a prediction process. The prediction unit 120 acquires the latest access history from the command processing unit 110 (S20), and then references the access pattern record table T3 (S21).

The prediction unit 120 determines whether or not an access pattern comprising the same access sequence as the access sequence of the latest access history and the access history of immediately prior to the latest access history is registered in the table T3 (S22). That is, the prediction unit 120 determines whether or not an access pattern that partially matches an access target sequence of the most recently issued access requests is registered in the table T3. When a matching access pattern is not registered in the table T3 (S22: NO), processing returns to S20.

When a matching access pattern is registered in the table T3 (S22: YES), the prediction unit 120 selects the next access target stored in this access pattern as a power-on candidate (S23). A power-on candidate here is the candidate volume (disk drive) predicted to be accessed next by a host system 20. A power-on candidate can also be called a next access target candidate.

For example, when the access target in the latest access request is Vb, and the access target of the previous access request is Va, the most recent access history constitutes the sequence Va→Vb. If the access pattern Va→Vb→Vc is registered in the table T3, the prediction unit 120 selects the next access target Vc stored in this access pattern as the power-on candidate. Further, when another access pattern of Va→Vb→Vd is registered in the table T3, the prediction unit 120 selects the next access target Vd as another power-on candidate.

The prediction unit 120 determines whether or not multiple power-on candidates has been selected in S23 (S24). If multiple power-on candidates has been selected (S24: YES), the prediction unit 120 selects the power-on candidate that has the most times of hits as the next access target (S25). When only one power-on candidate has been selected (S24: NO), the prediction unit 120 selects this sole power-on candidate as the next access target (S26).

The prediction unit 120 instructs the power control unit 130 to feed power to the next access target disk drive 210 predicted in either S25 or S26 (S27). Furthermore, when power is already being fed to the disk drive 210 predicted to be the next access target, there is no need to issue the instruction of S27. The power control unit 130 generates a power-on signal via the control signal sender 132 corresponding to the next access target disk drive 210.

The power-on signal is transmitted to the local power unit 310 connected to the next access target disk drive 210 via the signal line 401. The local power unit 310, upon receiving a power-on signal, feeds direct current power of a predetermined voltage to the disk drive 210. The disk drive 210 being fed the power performs a self-diagnostic, and transitions to a spin-up state by rotating the spindle motor to a predetermined number of revolutions.

As described as the above, in the prediction process of this embodiment, the logical volume 230 (disk drive 210) to be accessed next by a host system 20 is predicted based on an access request from the host system 20 and the recorded history of the access pattern record table T3. Then, an instruction is given to feed power to the disk drive 210 related to the predicted logical volume 230. Thus, it is possible to power on the next access target disk drive 210 before it is accessed by the host system 20, enabling power to be turned on in advance of an access. Therefore, when a prediction is correct, host system 20 access time is reduced dramatically.

Figure 8:
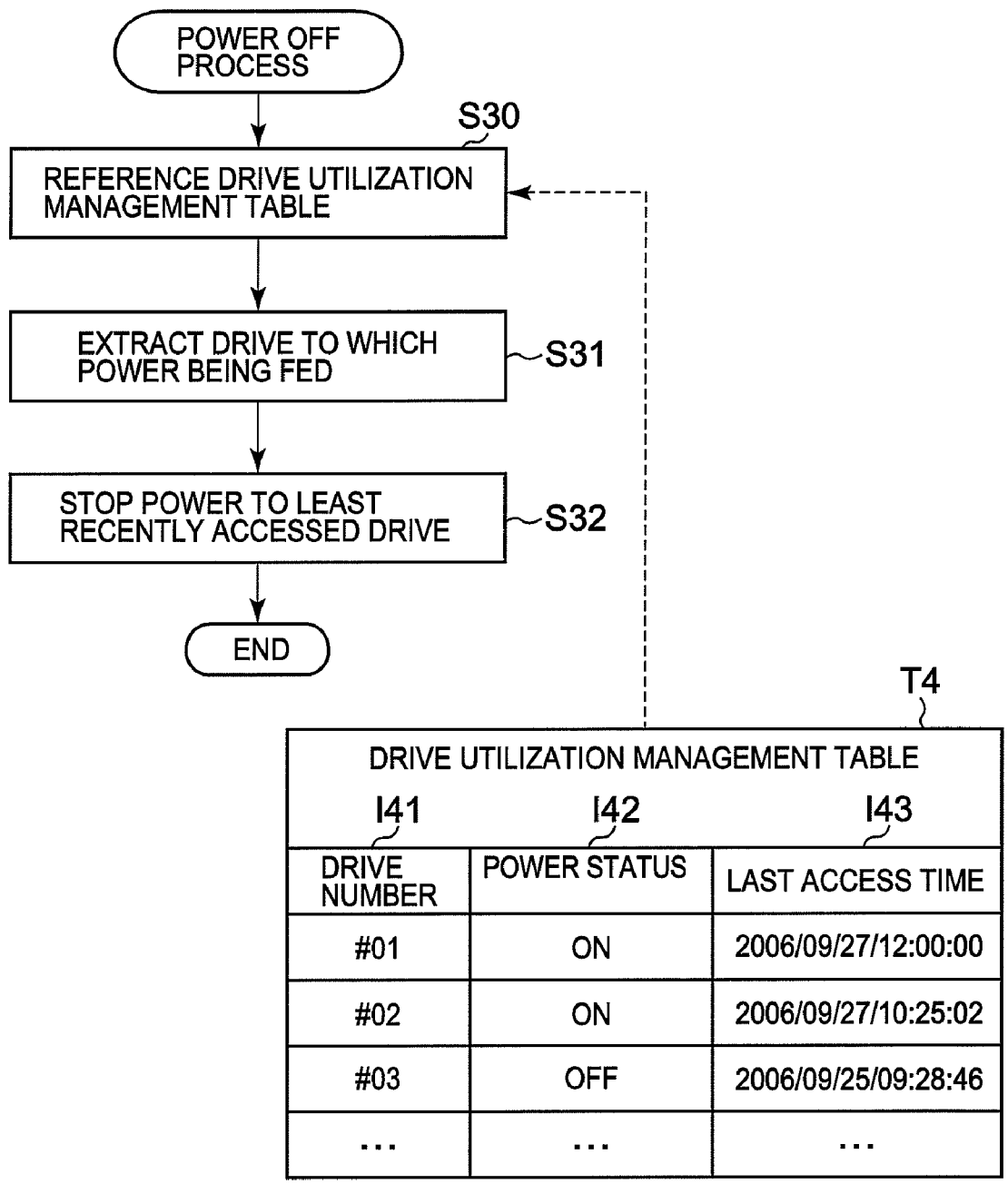
FIG. 8 is a flowchart showing a process for stopping the feeding of power to a disk drive.

FIG. 8 is a flowchart showing a power-off process. The controller 100 references a drive utilization management table T4 (S30), and extracts a disk drive 210 to which power is currently being fed (S31). Then, the controller 100 selects the least recently accessed disk drive 210 as the power-off target from the disk drives 210 being powered on, and sends a power-off signal to the local power unit 310 connected to this power-off target disk drive 210 (S32). The local power unit 310, which receives the power-off signal, stops the feeding of power. Accordingly, the disk drive 210 connected to this local power unit 310 stops operation.

The drive utilization management table T4 shown at the bottom of FIG. 8 manages the power feeding states and access states of the respective disk drives 210. This table T4, for example, correspondingly manages a drive number I41, a power feeding status I42, and a last access time I43.

The drive number I41 is information identifying the respective disk drives 210. The power feeding status I42 is information indicating whether or not power is being fed to a disk drive 210. The last access time I43 is information indicating the last access time of the respective disk drives 210. Furthermore, another item besides the above-mentioned items I41 through I43 can also be added to the table T4.

According to the above-described power-off process, it is possible to individually stop power to a disk drive 210 that does not need to be powered on, based on the utilization status of the disk drive 210. Furthermore, in S32, the disk drive 210 with the least recent access time was selected as the power-off target, but instead, for example, it is considerable that the disk drive 210 that has not been accessed for the predetermined period or longer is selected as the power-off target.

Because this embodiment is constituted as described as the above, it is possible to individually stop feeding power to disk drives 210 that do not require power on, enabling the power consumption of the storage system 10 to be reduced. Further, since it is possible to reduce power on time, the life time of a disk drive 210 can be lengthened, the frequency at which a disk drive 210 is replaced can be reduced, and the efficiency of maintenance work can be enhanced.

In this embodiment, a disk drive 210 that a host system 20 will access next can be predicted by analyzing a plurality of access requests issued by the host system 20, and comparing the results of this analysis against an access pattern registered in the access pattern record table T3. Then, a spin-up state can be achieved by promptly feeding power to the predicted disk drive 210, making it possible to enhance the responsiveness of the storage system 10. Thus, a storage system 10 of this embodiment can simultaneously pursue power saving and response performance, thereby enhancing usability.

Furthermore, it is considerable that write completion status is reported to the host system 20 just after the write data received from a host system 20 is stored in the cache memory when the controller 100 comprises a cache memory. In this case, it is possible that the next access target is only predicted when a read command is received and is not predicted when a write command is received.

Second Embodiment

A second embodiment of the present invention will be explained on the basis of FIGS. 9 and 10. The following embodiments, to include this embodiment, correspond to variations of the first embodiment. In this embodiment, power-on timing is delayed as much as possible by over all managing not only the sequence in which access is requested, but also access time intervals, thereby realizing even greater power savings.

FIG. 9 is a drawing showing an access pattern record table T5 utilized by a storage system 10 according to this embodiment. This table T5 has the same part as table T3 shown in FIG. 5, and, for example, is configured by making a record number I51, times of hits I52, history length I53, and access sequence I54 correspond to one another.

The difference with the table T3 shown in FIG. 5 is that, in addition to the sequence I54A in which logical volumes have been accessed, the time interval I54B of adjacent accesses is included in the access sequence I54 indicating an access pattern. That is, in table T5, not only is the access sequence managed, but also the time from one access to the next access. The time interval that occurs the most often, the most recently observed time interval, and an average time interval, for example, can be used as this time interval I54B.

Figure 10:
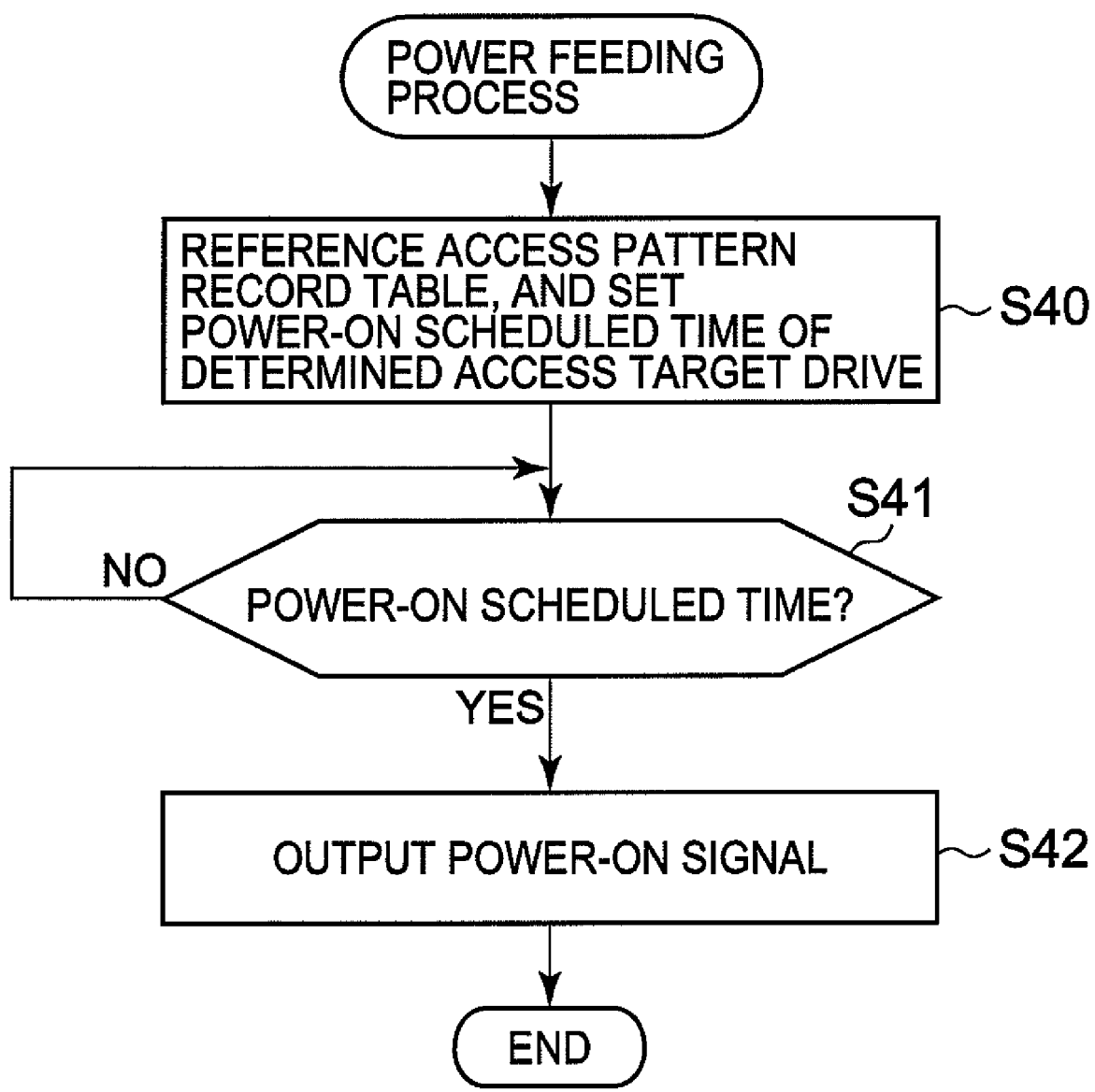
FIG. 10 is a flowchart showing a process for feeding power to a disk drive based on a prediction result.

FIG. 10 is a flowchart showing a power feeding process. As a prerequisite for commencing this process, it is supposed that the prediction unit 120 has predicted the next access target logical volume 230 (disk drive 210). In the above-described embodiment, power is fed to the next access target disk drive 210 immediately after a prediction, but in this embodiment, as will be described as below, power is fed to a disk drive 210 by taking the time required for power-on into account.

The controller 100 references the access pattern record table T5, ascertains the scheduled time at which the logical volume 230 is to be accessed, and sets a time, which is advanced by a predetermined time than this scheduled time, as the power-on scheduled time (S40). The predetermined time is the time required until power-on has been completed by feeding power to a disk drive 210 that is not being fed power. That is, it is the time needed to power on.

The controller 100 determines if the power-on scheduled time set in S40 has arrived (S41). When the power-on scheduled time has arrived (S41: YES), the controller 100 commences feeding power to the disk drive 210 (S42).

This embodiment also exhibits the same effect as the first embodiment. In addition, this embodiment also jointly manages the time between one access and the next access as the history, and feeds power to a disk drive 210 so as to meet a scheduled access time. Therefore, it is possible to reduce power on time so that the amount of power consumed is further reduced. Also it is possible to extend the life time of the disk drives 210 even more than in the first embodiment.

Third Embodiment

A third embodiment will be explained on the basis of FIGS. 11 and 12. In this embodiment, the feeding of power to the respective disk drives 210 is individually controlled in accordance with a schedule preset by a user.

Figure 11:
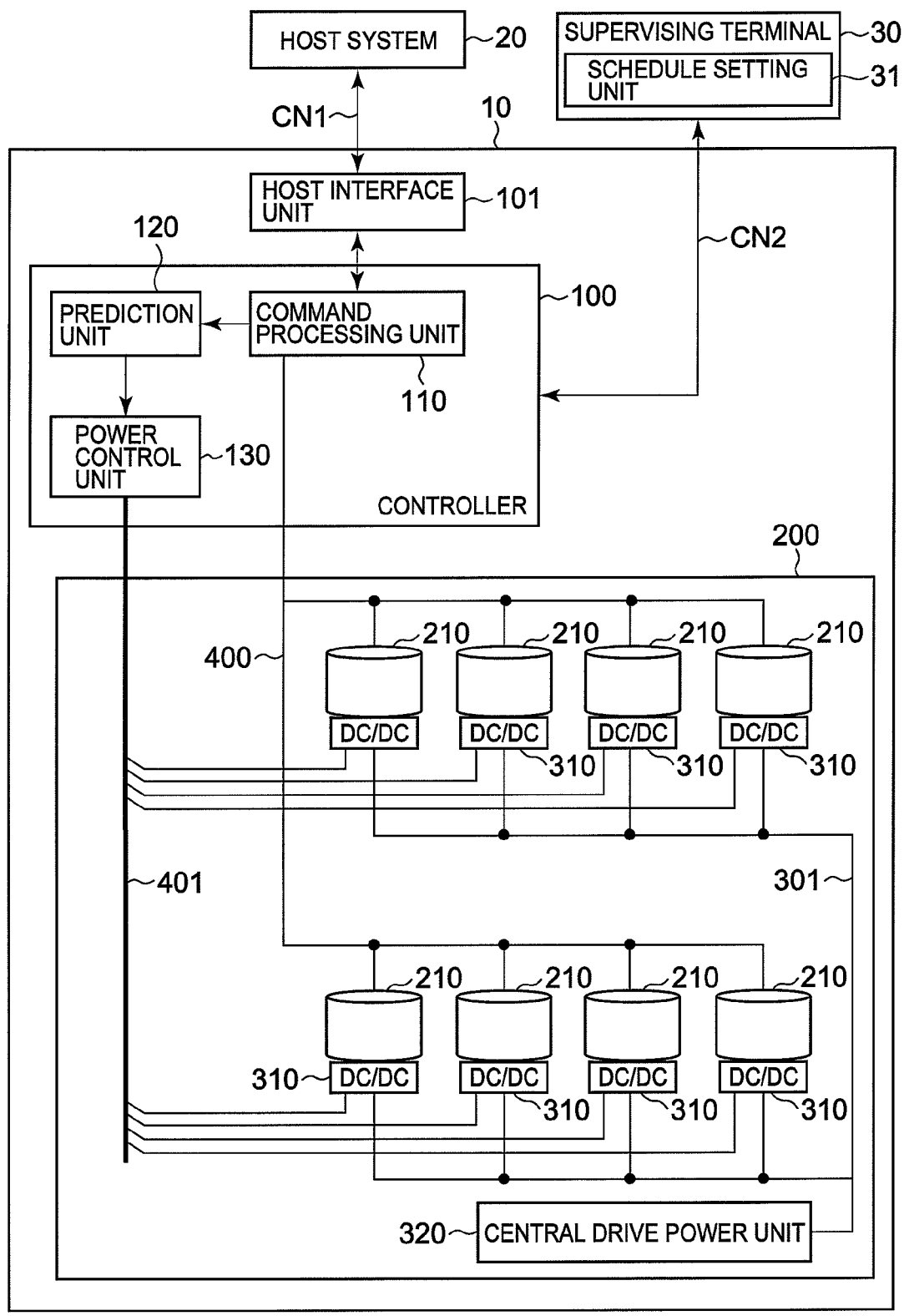
FIG. 11 is a drawing showing a structure of a storage system in which a storage system related to a third embodiment of the present invention is utilized.

FIG. 11 is a drawing showing a storage system, which comprises a storage system 10 according to this embodiment. A schedule setting unit 31 is provided in the supervising terminal 30. The schedule setting unit 31 can be realized as software, which provides a function for a user to set a power control-related schedule (the power-on schedule shown in FIG. 12).

Figure 12:
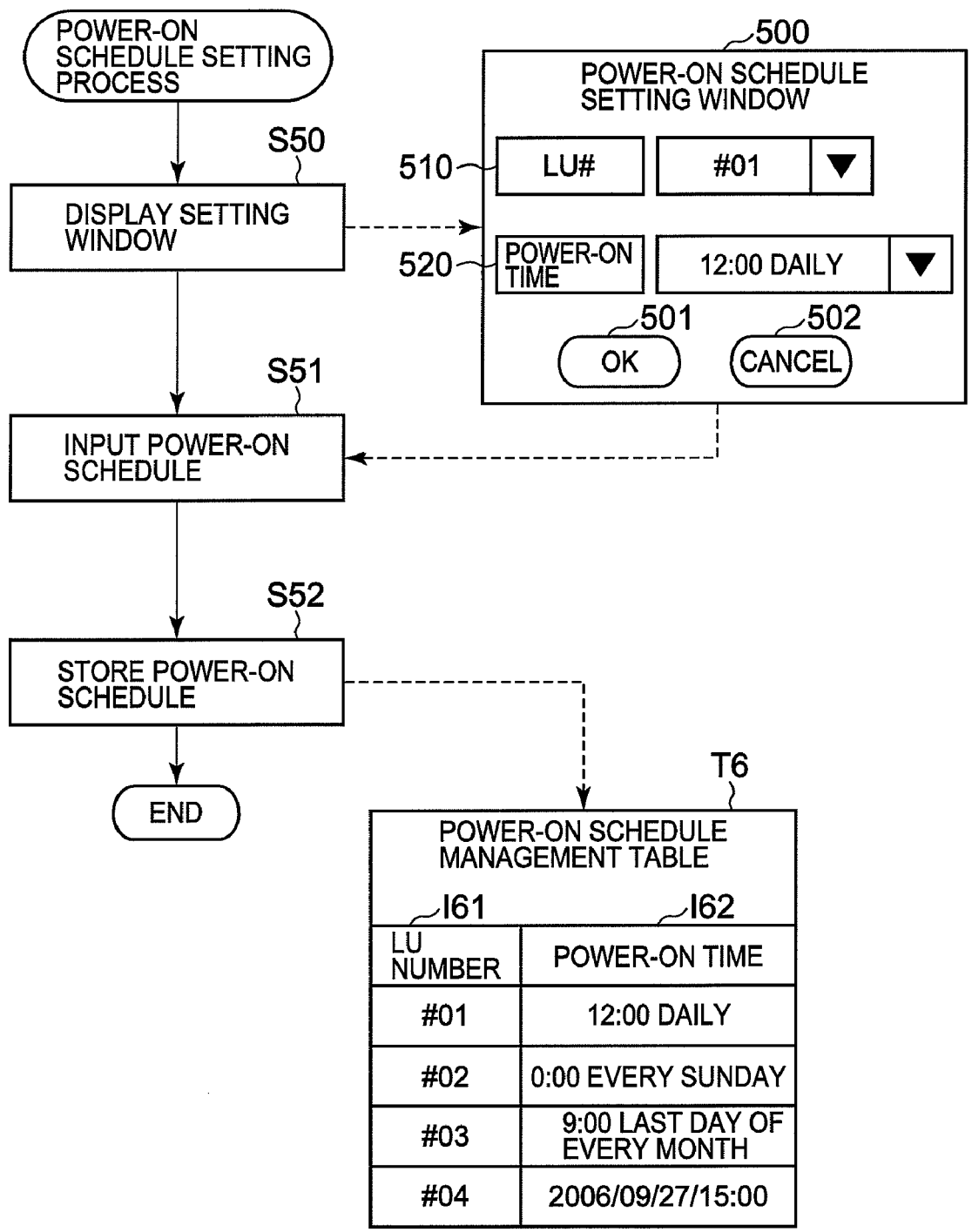
FIG. 12 is a flowchart showing a process for setting in a controller a schedule for powering on a disk drive.

FIG. 12 is a flowchart showing the process for setting a power-on schedule. When a user starts up the schedule setting unit 31 of the supervising terminal 30, a power-on schedule setting window 500 is displayed on the terminal screen (S50). The user utilizes this setting window 500 to input a power-on target logical volume 230 and power-on time (S51).

The power-on schedule setting window, for example, comprises a volume setting box 510, a power-on time setting box 520, an OK button 501 and a cancel button 502. The user specifies the number of a power-on target logical volume 230 using the volume setting box 510. The user also specifies a time for powering on this logical volume 230 using the power-on time setting box 520. When completing setting contents using the respective setting boxes 510, 520, the user can push the OK button 501. When canceling contents that have been set, the user can push the cancel button 502.

The controller 100 registers a power-on schedule inputted via the supervising terminal 30 in a power-on schedule management table T6 (S52). The power-on schedule management table T6, for example, manages a volume number I61 and a power-on time I62 as a pair. The volume number I61 is information for specifying a power-on target logical volume 230. The power-on time I62 is information indicating the scheduled time for powering on by feeding power to the disk drive 210 related to this logical volume 230.

The power-on time, for example, can be set as a predetermined time, such as "12:00 daily", "0:00 every Sunday" and "9:00 on the last day of every month", or this power-on time can be set specifying a year, month, day, hour, minute and second, such as "2006/09/27/15:00".

This embodiment, which is constituted like this, can reduce the power consumption of the storage system 10 by stopping power to a disk drive 210 that does not need power the same as the first embodiment, and it can also power on a disk drive 210 in advance in accordance with a power-on schedule, thus enhancing the responsiveness of the storage system 10.

Furthermore, the first embodiment and the third embodiment can be combined. That is, it is considerable that power is fed in accordance with a power-on schedule for a disk drive 210 related to a logical volume 230 set in a power-on schedule, and power is fed in accordance with the results of a prediction by the prediction unit 120 for a disk drive 210 related to a logical volume 230 that is not set in a power-on schedule.

Fourth Embodiment

A fourth embodiment will be explained on the basis of FIG. 13. In this embodiment, a power-on schedule comprises both a power-on time and a power-off time.

Figure 13:
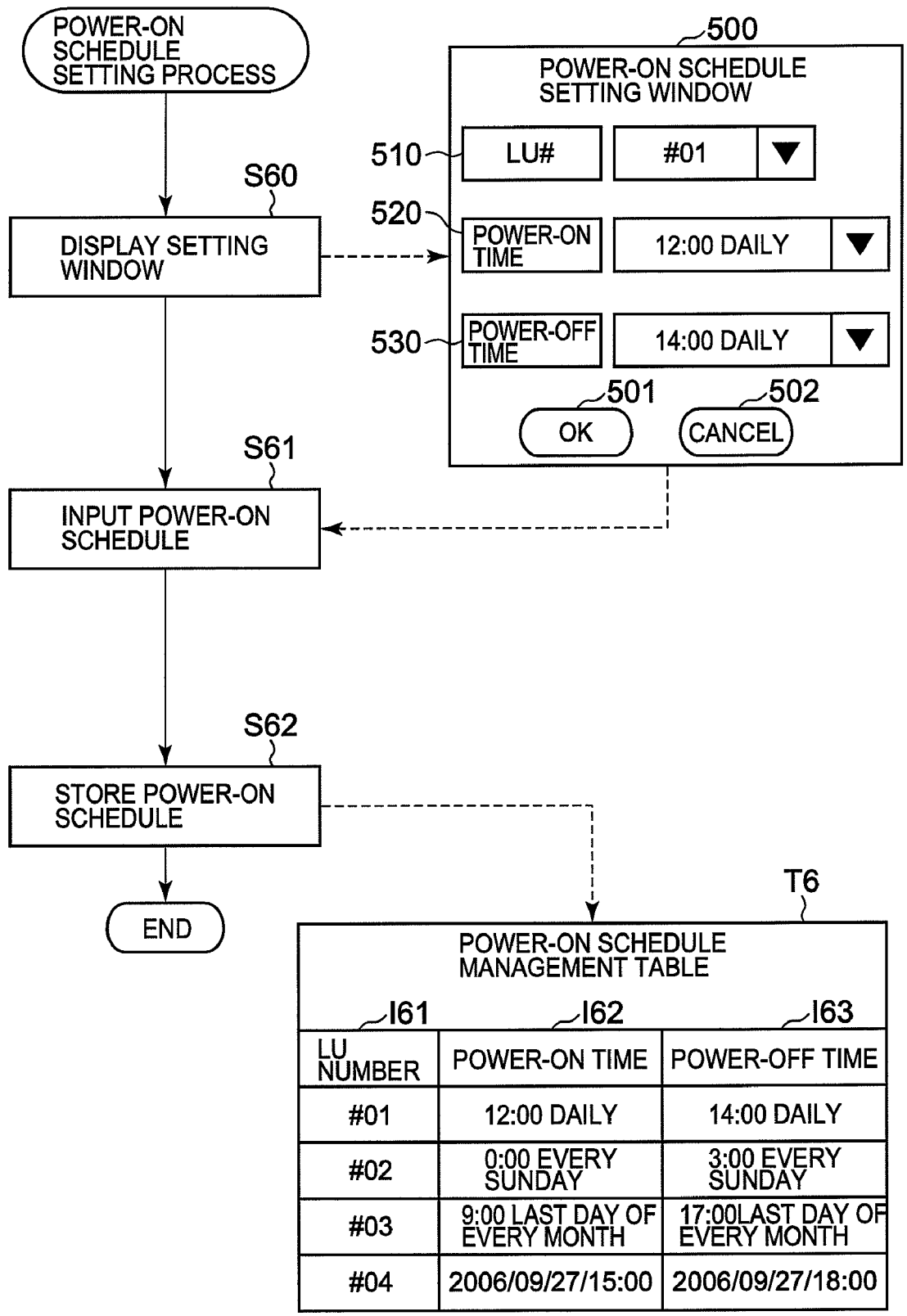
FIG. 13 is a flowchart showing a process for setting a power on schedule used in a storage system related to a fourth embodiment of the present invention.

FIG. 13 is a flowchart showing a power-on schedule setting process used in a storage system 10 according to this embodiment. This process comprises steps S60 through S62, which are the same as those in the process shown in FIG. 12. Since S60 through S62 correspond to S50 through S52 in FIG. 12, a redundant explanation will be omitted.

In the power-on schedule setting window of this embodiment, a power-off time setting box 530 for setting a time to stop the power is added. Correspondingly, a power-off time I63 is added to the power-on schedule management table T6.

Therefore, a user can set a time for stopping power in the controller 100 from the supervising terminal 30. The controller 100 feeds and stops power to the disk drive 210 related to a specific logical volume 230 in accordance with the setting contents of the power-on schedule management table T6.

This embodiment, which is constituted like this, also exhibits the same effect as the first and third embodiments. Further, this embodiment can also be combined with the first embodiment the same as the above-mentioned third embodiment. That is, for a disk drive 210 related to a logical volume 230 that is not set in a power-on schedule, power is fed in accordance with a prediction based on an access request from a host system 20 as described in the first embodiment. Then, for example, power is stopped to a disk drive 210 that has not been accessed for a predetermined time or longer. Conversely, for a disk drive 210 related to a logical volume 230 that is set in a power-on schedule, power is fed at the set power-on time, and power is stopped at the set power-off time.

Fifth Embodiment

A fifth embodiment will be explained on the basis of FIG. 14. This embodiment stops power to the respective disk drives 210 by taking the times of power control operation of the respective disk drives 210 (hereinafter, referred to as the ON/OFF times) into account.

The controller 100 references the drive utilization management table T4 (S70), and detects the least recently accessed disk drive 210 which is powered on(S71). For the sake of expediting the explanation, this least recently accessed disk drive 210 is called disk drive D0 here.

Figure 14:
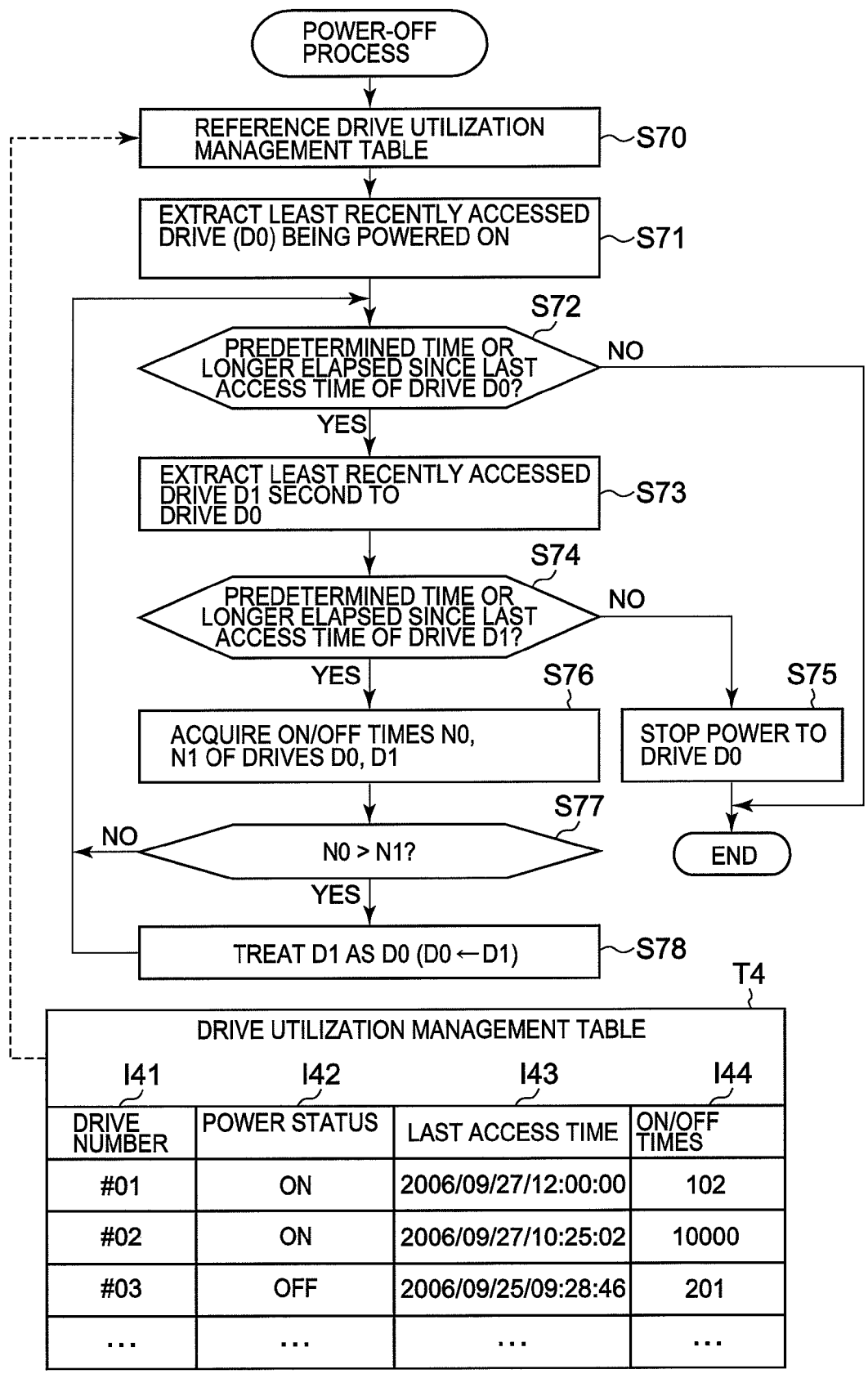
FIG. 14 is a flowchart showing a power off process related to a fifth embodiment of the present invention.

As shown at the bottom of FIG. 14, the drive utilization management table T4 comprises items I41 through I42 the same as table T4 shown in FIG. 8, and additionally comprises ON/OFF times I44 as a new item. ON/OFF times I44 is the total number of times that power has been started to be fed and stopped to a disk drive 210.

Returning to the flowchart explanation, the controller 100 determines if a preset time has passed since the last access time of the disk drive D0 that has been accessed least recently (S72). For example, when a preset time of around one hour has not passed (S72: NO), the controller 100 ends this process.

When a preset time has passed since the last access time of the disk drive D0 (S72: YES), the controller 100 detects the least recently accessed disk drive 210 second to disk drive D0 (S73). In the following explanation, the least recently accessed disk drive second to disk drive D0 will be called disk drive D1.

The controller 100 determines if a preset time has passed since the last access time of disk drive D1 (S74). When a preset time has not passed since the last access time of disk drive D1 (S74: NO), the controller 100 stops the power to disk drive D0 (S75).

When a preset time has passed since the last access time of disk drive D1 (S74: YES), the controller 100 acquires the ON/OFF times N0 of disk drive D0 and the ON/OFF times N1 of disk drive D1, respectively (S76). Since it is possible to select either disk drive D0 or D1 as the power-off target when times that are longer than a preset time have passed since the time when both disk drives D0 and D1 were last accessed, a determination is made based on the ON/OFF times.

Accordingly, the controller 100 determines whether or not the ON/OFF times N0 of disk drive D0 is larger than the ON/OFF times N1 of disk drive D1 (S77).

When the ON/OFF times N0 of disk drive D0 is larger than the ON/OFF times N1 of disk drive D1 (S77: YES), the controller 100 treats disk drive D1 as disk drive D0 (S78), and returns to S72.

This is because stopping the power to disk drive D0 can reduce the life of disk drive D0 due to the fact that the total ON/OFF times N0 of disk drive D0 is large. Accordingly, the controller 100 lets disk drive D1, which is the second least recently accessed one, be the target of power controlling (D0←D1) without stopping the power to disk drive D0, which is the least recently accessed one, and which has the larger ON/OFF times N0, and repeats the above-described S72 through S77. Conversely, when the ON/OFF times N0 of disk drive D0 is less than the ON/OFF times N1 of disk drive D1 (S77: NO), this process returns to S72.

According to the above process, the feeding of power to the respective disk drives 210 can be stopped by taking the ON/OFF times of the respective disk drives 210 into account. Therefore, this embodiment can reduce power on time, reduce the ON/OFF times, and extend the life time of a disk drive 210.

Sixth Embodiment

A sixth embodiment will be explained on the basis of FIG. 15. In this embodiment, a detailed example of the prediction process in the first embodiment will be explained. However, table T5 shown in FIG. 9 will be used as the access pattern record table.

First, in accordance with the access pattern detecting process shown in FIG. 6, an access history of up to a predetermined length m is temporarily stored each time a host system 20 accesses a new logical volume 230. This access history, for example, can be recorded in the processor memory 122. In the following explanation, an access history of length m which represents recent accesses from the host system 20 will be called the history of recent accesses.

The prediction unit 120 sets a variable K to 2 (S80). The variable K can be stored in the processor memory 122, or it can be stored in some sort of register or temporary storage area inside the processor 121.

Next, the prediction unit 120 fetches a history of length K from the access pattern record table T5 (S81).

The prediction unit 120 compares history from the most recent access (the latest access) to the K-1-th access of the recent accesses against history from the second most recent access to the least recent access of length K fetched from the access pattern record table T5 (S82).

If the results of comparison indicate that these histories match, the prediction unit 120 makes the most recent access target volume of history of length K fetched from the access pattern record table the power-on candidate of the times of hits which is associated with the history(S83).

Next, the prediction unit 120 once again compares history from the most recent access (the latest access) up to K-th access of the recent accesses against history from the most recent access to the least recent access of length K fetched from the access pattern record table T5 (S84).

The prediction unit 120 determines, based on the results of comparison in S84, if these histories match (S85). When the determination is that the histories match (S85: YES), the prediction unit 120 increments by one the times of hits associated with the matched history in the access pattern record table T5 (S86).

If not even one matching history can be found (S85: NO), the prediction unit 120 registers the history from the most recent access to the K-th access of recent accesses in the access pattern record table T5 (S87).

Then, the prediction unit 120 increments the value of K by one (S88), and determines if the incremented result of K is less than or equal to m-1 (S89). When it is determined that the incremented result of K is less than or equal to m-1 (S89: YES), the prediction unit 120 returns to S81 and repeats the steps subsequent thereto. When it is determined that the incremented result of K is greater than m-1 (S89: NO), the prediction unit 120 determines if the incremented result of K is less than or equal to m (S90).

When it is determined that the value of K is less than or equal to m (S90: YES), the prediction unit 120 returns to S84, and only executes the process subsequent to S84 for registering a new history.

When it is determined that the value of K is greater than m (S90: NO), the prediction unit 120 checks the times of hits associated with the matched history fetched from the access pattern record table T5 where the logical volumes 230 is the power-on candidate each time in the process from S81 through S90 by referencing the table T5, and selects the logical volume 230 of the access history associates with the largest times of hits as the next access target volume (S91).

Then, in this S91, the prediction unit 120 specifies the disk drives 210 related to the selected logical volume 230 by referencing the address translation table T2, and instructs the power control unit 130 to feed power to the specified disk drives 210 (S91).

Here, when instructing power on in S91, the prediction unit 120 (or power control unit 130) outputs a power-on signal to the disk drives 210 in advance so that the disk drives 210 will have been completed to be powered on in time until when an access is predicted to be made from a host system 20, by taking the access interval and the time required to power on the disk drives 210 into account (S91).

Figure 15:
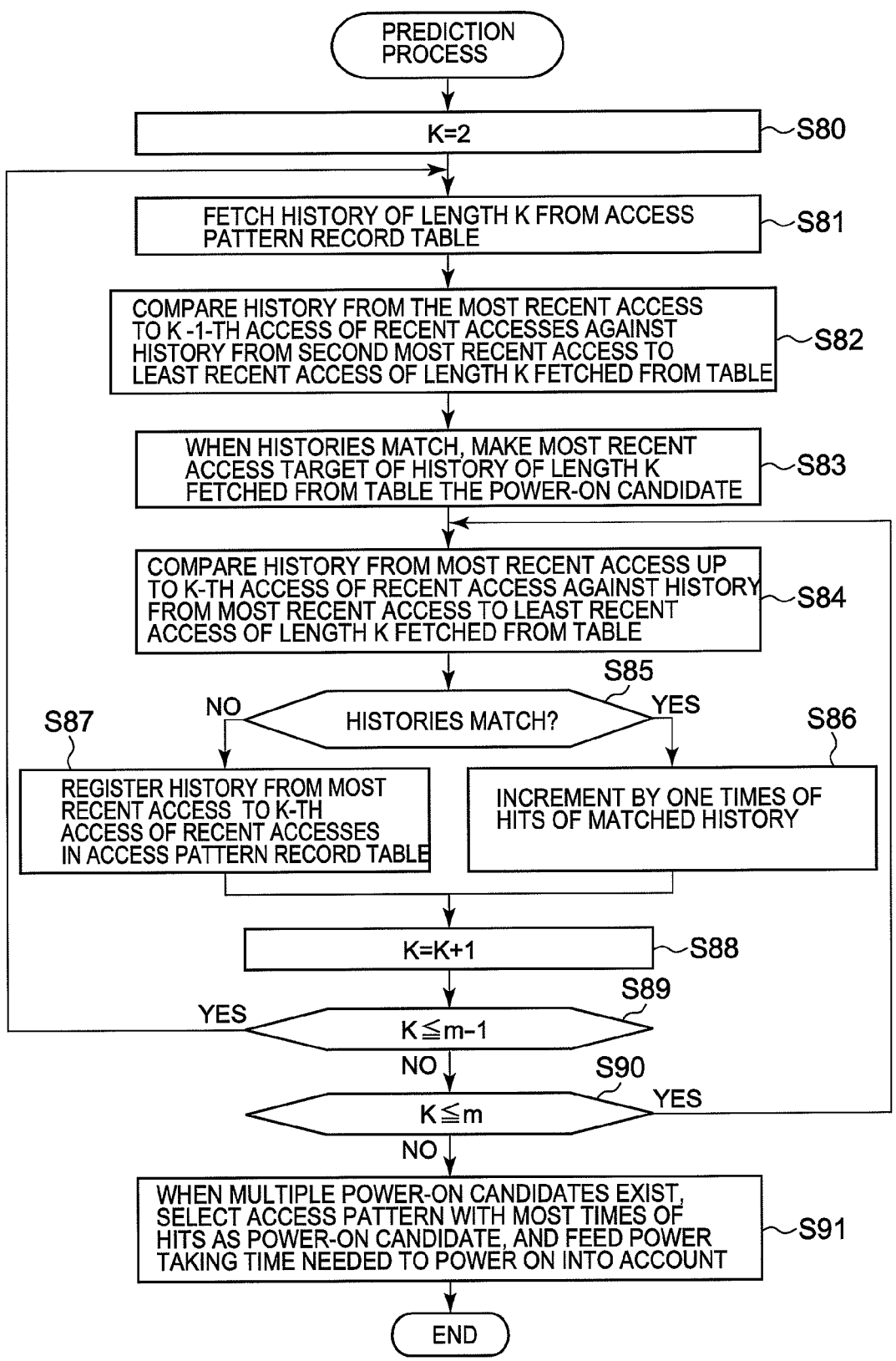
FIG. 15 is a flowchart showing a prediction process related to a sixth embodiment of the present invention.

Furthermore, when registering the history from the most recent access to the K-th access of recent accesses in the access pattern record table T5 as the new access history in S87 of FIG. 15, the amount of information stored in table T5 can be maintained at a fixed value by deleting a portion of the access patterns previously registered in this table T5.

For example, it is considerable that, when the number of records in table T5 reaches the upper limit to be registered, the access pattern with the fewest times of hits or the access pattern with the least recent hit can be deleted from among the registered access patterns.

This embodiment, which is constituted like this, also exhibits the same effect as the first and second embodiments.

Furthermore, the present invention is not limited to the embodiments described as the above. A person with ordinary skill in the art can make various additions and modifications within the scope of the present invention. For example, the respective embodiments can be suitably combined.

What is claimed is:

1. A storage system comprising a plurality of storage devices and a controller for inputting/outputting data to/from said storage devices based on an access request from a host system, wherein said controller comprises:
    an access request processing unit which inputs/outputs data to/from said storage devices based on an access request issued from said host system;
    a prediction unit which predicts at least one or more next access target storage devices to be accessed next by said host system of said storage devices based on the access request received by said access request processing unit;
    a power control unit which stops the feeding of power from a power unit to a storage device that satisfies a predetermined condition among said storage devices, and which feeds power from said power unit to said next access target storage device;
    wherein an access sequence of said respective storage devices and a time between one access and after another are stored in a history record table, and
    said power control unit feeds power prior to the time required for said next access target storage device to be powered on and to be ready to access so that said next access target storage device is powered on and is ready to access at the time when said host system is predicted to access said next access target storage device.

2. The storage system according to claim 1, wherein said prediction unit comprises a history record table for storing a history of the sequence in which said host system accesses said storage devices, and predicts said next access target storage device based on this said history stored in said history record table.

3. The storage system according to claim 2, wherein said controller comprises an address translation unit for translating a logical address, which is included in an access request from said host system, to a physical address of said storage devices, and
    said prediction unit stores a history of said logical address in said history record table.

4. The storage system according to claim 1, wherein at least a portion of the recorded contents of said history record table can be set from at least one of said host systems, or a supervising terminal connected to said controller.

5. The storage system according to claim 1, wherein said prediction unit can feed power and stop the feeding of power to said respective storage devices based on either a preset date or time.

6. The storage system according to claim 2, wherein information indicating prediction accuracy is also stored in said history record table, and
when a plurality of candidates for said next access target storage devices are predicted, said prediction unit selects one candidate with the highest prediction accuracy as said next access target storage device.

7. The storage system according to claim 1, wherein said power control unit stops the feeding of power to a storage device which is not predicted as said next access target storage device and which is the least recently accessed one of said storage devices.

8. The storage system according to claim 1, wherein said controller comprises a times of operation recorder for storing the times of operation of controlling power of said respective storage devices, and
said power control unit selects, of said storage devices, a predetermined number of storage devices in sequence from the least recently accessed storage devices which are not predicted as said next access target storage device, and stops the feeding of power to the storage device from among said selected storage devices that has the fewest times of operation of controlling power of it.

9. A method of controlling of feeding power to a plurality of storage devices respectively, in a storage system which comprises the storage devices and a controller for inputting/outputting data to/from said storage devices based on an access request from a host system, the method comprising:

storing a history of the sequence in which said host system accesses said respective storage devices, and a time between one access and another, in a history record table;

predicting a next access target storage device to be accessed next by said host system, on the basis of recorded histories in said history record table; and feeding power from a power unit to said next access target storage device, when power is not already fed from said power unit to said next access target storage device, prior to a time required for said next access target storage device to be powered on and to be ready to access so that said next access target storage device is powered on and is ready to access at the time when said host system is predicted to access said next access target storage device.

10. The method of controlling of feeding power to a storage system according to claim 9, further comprising stopping the feeding of power to a storage device, which is not predicted as said next access target storage device and is one of the least recently accessed storage devices.

11. The method of controlling of feeding power to a storage system according to claim 9, further comprising the steps of: selecting, of said storage devices, a predetermined number of storage devices in sequence from the least recently accessed storage devices which are not predicted as said next access target storage device; and stopping the feeding of power to a storage device from among the selected storage devices that has the fewest times of operation of controlling power of it.

* * * * *